(12) United States Patent
Huang (10) Patent No.: US 11,701,720 B2
(45) Date of Patent: Jul. 18, 2023

(54) TUBE CUTTER CAPABLE OF CUTTING TUBES WITH VARIOUS DIAMETERS

(71) Applicant: YUNG CHI INDUSTRY CO., LTD., Taichung (TW)

(72) Inventor: Wu Sheng Huang, Taichung (TW)

(73) Assignee: YUNG CHI INDUSTRY CO., LTD., Taichung (TW)

(*) Notice: Subject to any disclaimer, the term of this patent is extended or adjusted under 35 U.S.C. 154(b) by 0 days.

(21) Appl. No.: 17/696,731

(22) Filed: Mar. 16, 2022

(65) Prior Publication Data

US 2022/0379390 A1 Dec. 1, 2022

(30) Foreign Application Priority Data

May 27, 2021 (TW) .................... 110119276

(51) Int. Cl.
*B23D 21/04* (2006.01)
*B23D 21/08* (2006.01)
*B26D 3/16* (2006.01)

(52) U.S. Cl.
CPC .............. *B23D 21/04* (2013.01); *B23D 21/08* (2013.01); *B26D 3/166* (2013.01)

(58) Field of Classification Search
CPC ... B23D 1/04; B23D 1/06; B23D 1/08; B23D 1/10; B25D 3/001; B25D 3/169; B25D 3/166; B26D 7/02; B26D 7/013
USPC ........................................................ 30/93
See application file for complete search history.

(56) References Cited

U.S. PATENT DOCUMENTS

| 3,335,492 | A | * | 8/1967 | Spiro | B23D 21/08 30/101 |
|---|---|---|---|---|---|
| 4,831,732 | A | * | 5/1989 | Garton | B23D 21/08 30/101 |
| 4,890,385 | A | * | 1/1990 | VanderPol | B23D 21/04 30/94 |
| 6,889,579 | B1 | * | 5/2005 | Brown | B25B 27/10 81/58 |
| RE40,461 | E | * | 8/2008 | Hu | B23D 21/08 30/94 |
| 9,566,652 | B2 | * | 2/2017 | Nasiell | B23D 21/04 |
| 10,059,018 | B2 | * | 8/2018 | Zhou | B26D 3/169 |
| 2005/0086809 | A1 | * | 4/2005 | Myers | B23D 21/08 81/182 |
| 2012/0023752 | A1 | * | 2/2012 | Rampling | B26D 3/169 30/94 |
| 2013/0152401 | A1 | * | 6/2013 | Lee | B26D 3/169 30/99 |
| 2017/0173710 | A1 | * | 6/2017 | Zhou | B26D 3/169 |
| 2018/0194029 | A1 | * | 7/2018 | Zhou | B23D 21/08 |
| 2018/0319030 | A1 | * | 11/2018 | Hung | B26B 1/02 |

(Continued)

*Primary Examiner* — Evan H MacFarlane
*Assistant Examiner* — Fernando A Ayala
(74) *Attorney, Agent, or Firm* — Sinorica International Patent & Trademark (57) ABSTRACT

A tube cutter includes a main device, a blade and a controller. The main device includes a fixed member and a movable member, wherein the movable member is movably connected to the fixed member, and a cutting space is formed between the fixed member and the movable member. The blade is fixed to the main device, and the blade has a blade portion in the cutting space. The controller, which is provided on the main device, can be operated to move the movable member for changing a size of the cutting space.

7 Claims, 6 Drawing Sheets

(56) References Cited

U.S. PATENT DOCUMENTS

| | | | |
|---|---|---|---|
| 2020/0223086 A1* | 7/2020 | Rampling | B26D 3/16 |
| 2020/0290137 A1* | 9/2020 | Lee | B23D 35/007 |
| 2020/0346291 A1* | 11/2020 | Canis | B23D 21/10 |
| 2021/0060670 A1* | 3/2021 | Chen | B26D 7/04 |
| 2022/0305574 A1* | 9/2022 | Rampling | B26D 3/169 |

* cited by examiner

FIG. 6

TUBE CUTTER CAPABLE OF CUTTING TUBES WITH VARIOUS DIAMETERS

BACKGROUND OF THE INVENTION

1. Technical Field

The present invention relates to a tube cutter, and more particularly to a tube cutter capable of cutting tubes with various diameters.

2. Description of Related Art

Power wiring system is one of the important parts in an interior decoration. Works usually need to cut tube for a power wiring system. Thus, tube cutter is presented in the market for such task.

A conventional tube cutter is provided with several rollers and a blade in a cutting space and a handle to control the blade. A tube is installed in the cutting space, and then operating the handle to cut the tube by the blade.

Aforesaid conventional tube cutter usually is capable of cutting the tubes with a specified diameter. When a tube with different diameter is needed to be cut, worker has to find another tube cutter instead. An improved tube cutter is provided in the market to cut tube with different diameters. However, the positions of the rollers and the blade are fixed, so that only the tube with a small range of diameters may be cut by such tube cutter. In spite of that, worker has to make some adjustment to the tube cutter when a tube with different diameter is ready to cut.

BRIEF SUMMARY OF THE INVENTION

In view of the above, the primary objective of the present invention is to provide a tube cutter, which may cut tubes with a wide range of diameters in an easy way.

In order to achieve the objective of the present invention, a tube cutter includes a main device, a blade, and a controller. The main device includes a fixed member and a movable member, wherein the movable member is movably connected to the fixed member, and a cutting space is formed between the fixed member and the movable member. The blade is fixed to the main device, and the blade has a blade portion in the cutting space. The controller, which is provided on the main device, can be operated to move the movable member for changing a size of the cutting space.

In an embodiment, the fixed member is provided with a receiving room, in which a portion of the movable member is received, and a first connector is provided to pivot the movable member on the fixed member.

In an embodiment, the controller has a cam pivoted on the fixed member, and the cam has a first cam face and a second cam face; the movable member has a resting portion to rest against the first cam face or the second cam face of the cam when the cam is turned to move the movable member relative to the fixed member.

In an embodiment, the controller further includes an elastic member, and the elastic member urges the movable member to press the resting portion thereof on the cam.

In an embodiment, the elastic member has two coil portions and a connecting portion with opposite ends connected to the coil portion; a second axle passes through the fixed member and the coil portions; the elastic member is connected to the fixed member with the connecting portion against the movable member.

In an embodiment, the controller further has an arm; the arm is pivoted on the fixed member; the arm has a guiding slot; a guider is inserted into the guiding slot of the arm and connected to the movable member, whereby the guider moves in the guiding slot when the movable member is moved relative to the fixed member.

In an embodiment, the controller further has two arm and a pipe; the arms are pivoted on the fixed member, and the pipe is provided between the arms; each of the arms has a guiding slot; a second axle passes through the fixed member, the arms and the pipe; two guiders are inserted into the guiding slots of the arms respectively and connected to the movable member, whereby the guiders moves in the guiding slots when the movable member is moved relative to the fixed member.

In an embodiment, the controller further includes a knob connected to the cam to be operated by a user.

In an embodiment, the blade has a portion embedded in the fixed member, and the blade portion is projected from a surface of the fixed member.

In an embodiment, the cam further has a third cam face to rest against the resting portion of the movable member when the cam is turned.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
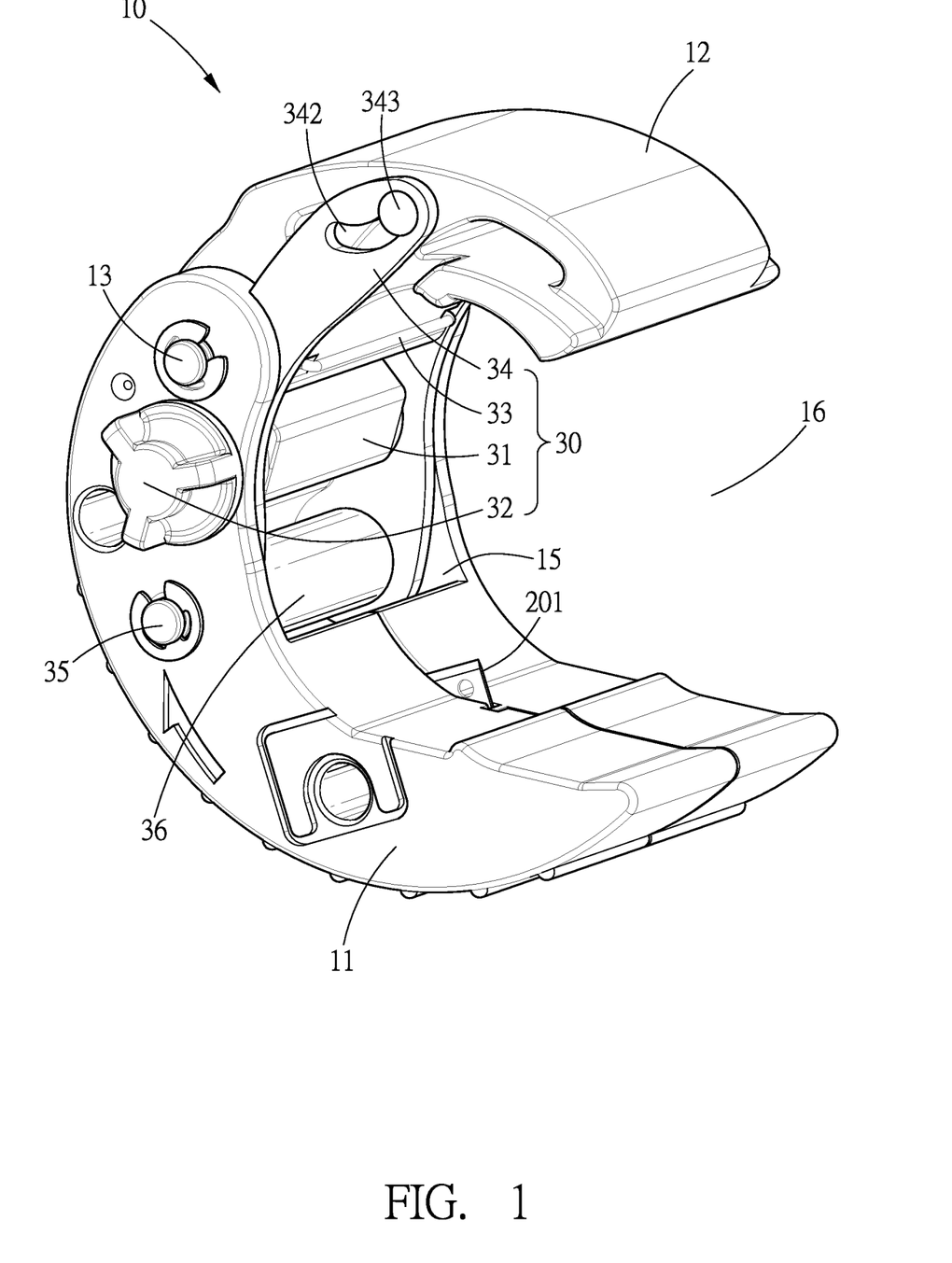
FIG. 1 is a perspective view of a preferred embodiment of the present invention.
Figure 2:
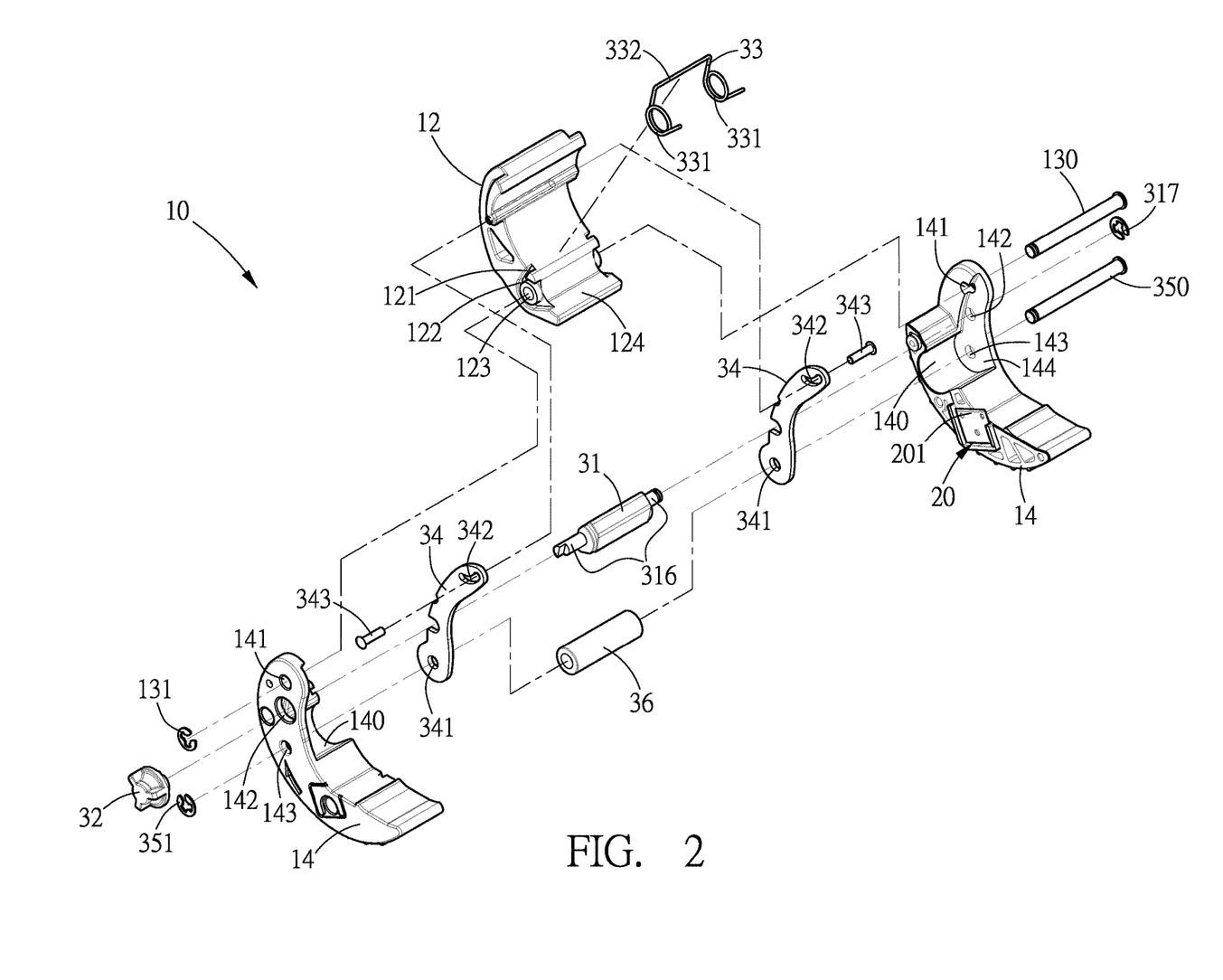
FIG. 2 is an exploded view of the preferred embodiment of the present invention.

As shown in FIG. 1 and FIG. 2, a tube cutter of the preferred embodiment of the present invention includes a main device 10, a blade 20 and a controller 30.

The main member 10 includes a fixed member 11, a movable member 12, and a first connector 13. The fixed member 11 is an arched case combined by two shells 14. Each of the shells 14 has a cavity 140, and a first bore 141, a second bore 142 and a third bore 143 on a sidewall of the cavity 140. Each of the cavities 140 has a recess 144. The cavities 140 form a receiving room 15 when the shells 14 are combined. The movable member 12 has a straight first slot 121, a round second slot 122 and a first hole 123 on a bottom of the second slot 122. The movable member 12 has a resting portion 124 adjacent to an end thereof. The movable member 12 is pivoted on the fixed member 11 with the resting portion 124 received in the receiving room 15 and the first hole 123 aligned with the first bores 141. The first connector 13 has a first axle 130 and a first locker 131. The first axle 130 is inserted into the first bore 141, the first hole 123 and the other first bore 141 in sequence. A head is formed on an end of the first axle 130 to rest against the fixed member 11, and an annular slot is formed on the first axle 130 adjacent to the other end. The annular slot is left out of the fixed member 11, so that the first locker 131, which is a C-ring in the present embodiment, engages the annular slot. As a result, the movable member 12 is pivoted on the fixed member 11 with the first axle 130 being a center of rotation. As shown in FIG. 1, the main device 10 is a C-shaped member to enclose a cutting space 16, and the movable member 12 is movable relative to the fixed member 11 to change a size of the cutting space 16.

The blade 20 is made of metal fixed to the fixed member 11 of the main device 10. The blade 20 has a blade portion 201 received in the cutting space 16. In the present embodiment, the blade 20 is a rectangular plate, having a portion embedded in the fixed member 11, and the blade portion 201 is projected from a surface of the fixed member 11.

As shown in FIG. 2 and FIG. 3 again, the controller 30 has a cam 31, a knob 32, an elastic member 33 and two arms 34. The cam 31 has a first cam face 311, a second cam face 312, a third cam face 313, a fourth cam face 314, and a fifth cam face 315. Distances between the first to the fifth cam faces 311-315 and a center of rotation of the cam 31 are different. The cam 31 is provided with a shaft 316 at the center of rotation, and the shaft 316 has opposite ends passing through the second bores 142 of the fixed member 11. A locker 317 is provided to engage one end of the shaft 316 which comes out of the second bores 142, and the knob 32 is connected to the other end of the shaft 316. As a result, the cam 31 is received in the receiving room 15 and pivoted on the fixed member 11, and the cam 31 is able to be turned by exerting the knob 32. The first to the fifth cam faces 311-315 may rest against the resting portion 124 of the movable member 12 respectively when the cam 31 is turned to move the movable member 12. In conclusion, the movable member 12 is moved to change the size of the cutting space 16 by turning the knob 32. The elastic member 33 has two coil portions 331 and a connecting portion 332 with opposite end connected to the coil portions 331 to form a substantially U-shaped member. The coil portions 331 are received in the second slots 122 while the connecting portion 332 is received in the first slot 121 of the movable member 12. The elastic member 33 urges the fixed member 11 to provide the movable member 12 a spring force which normally move the movable member 12 in a direction away from the fixed member 11. The elastic member 33 urges the movable member 12 to press the resting portion 124 on the cam 31. The arms 34 are elongated plates, each having a second hole 341 and a guiding slot 342. Each of the arms 34 has a part received in the recesses 144 of the fixed member 11 with the second hole 341 aligned with the third bore 143. A second connector 35 has a second axle 350 and a second locker 351. A pipe 36 is provided between the arms 34 and aligned with the second holes 341 of the arms 34. The second axle 350 is inserted into the third bore 143, the second hole 341, the pipe 36, the other second hole 341 and the other third bore 143 in sequence, and secured by the second locker 351. Two guiders 343 are inserted into the guiding slot 342 of the arms 34 respectively and then fixed to the movable member 12. As a result, the arms 34 are turned and the guiders 343 move in the when the guiding slots 342 when the movable member 12 is turned to limit a range of motion of the movable member 12.

Figure 3:
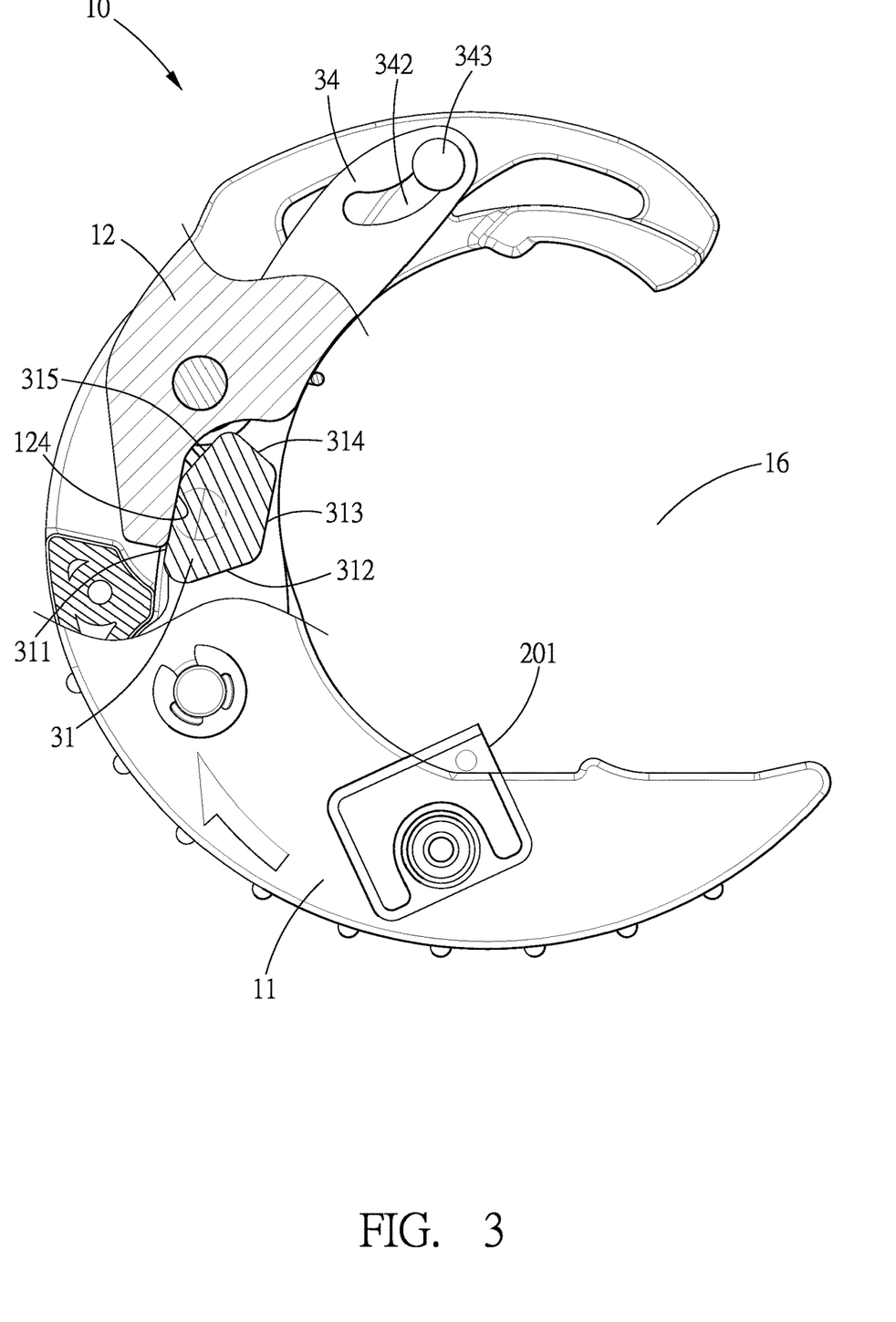
FIG. 3 is a sectional view of the preferred embodiment of the present invention, showing the cam being turned to the first position.

In operation of the tube cutter of the preferred embodiment of the present invention, a tube is put in the cutting space 16 ready for cut, and an operator turns the knob 32 to move to movable member 12 to a specific position for fitting the tube. As shown in FIG. 3, when a large tube (not shown) is put in the cutting space 16, the cam 31 is tuned to have the first cam face 311, which has the longest distance to the center of rotation, resting against the resting portion 124 of the movable member 12 to fit the tube. And then the operator turns the entire of the main device 10 until the blade portion 201 of the blade 20 cut the tube off.

Figure 4:
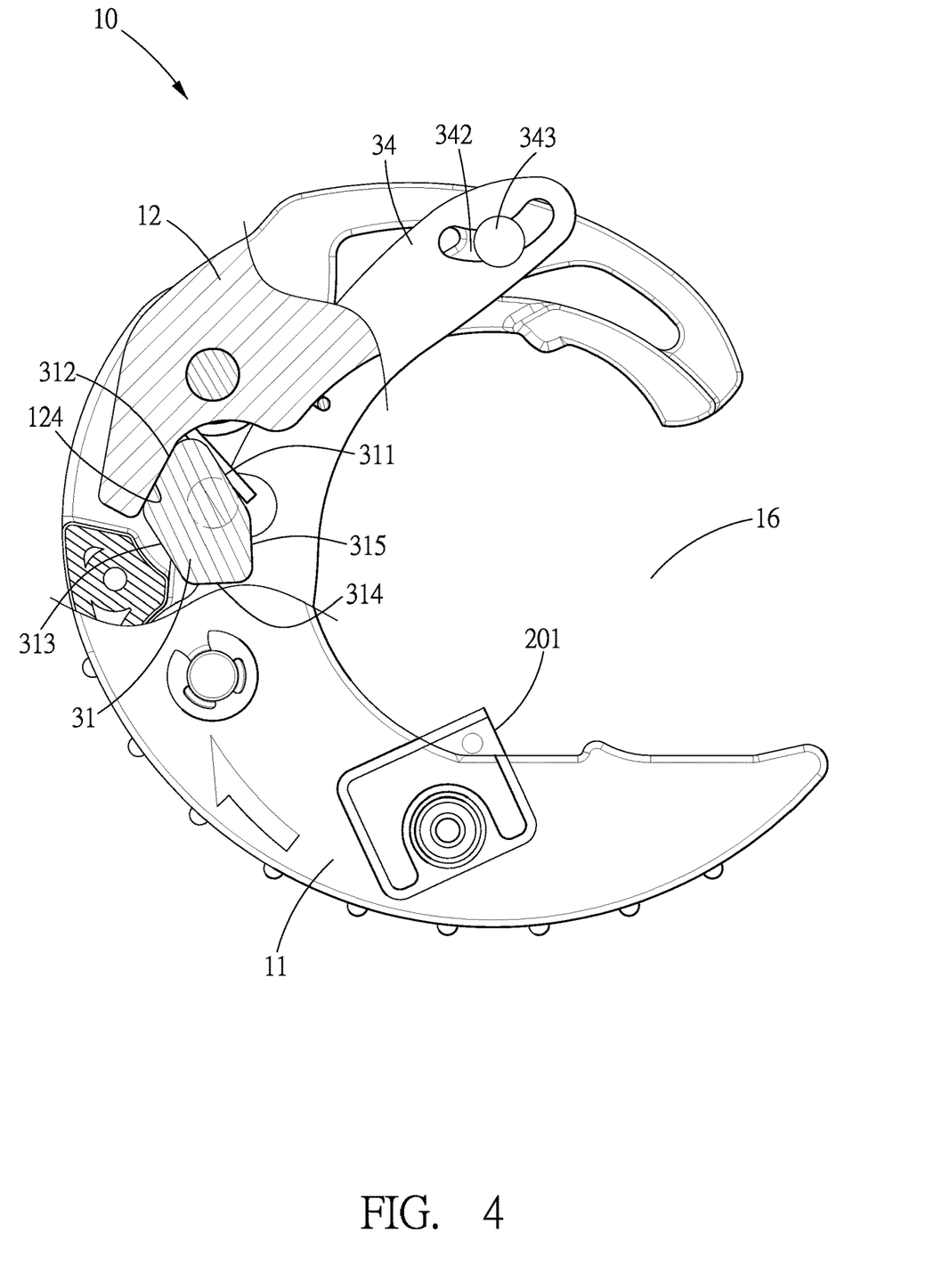
FIG. 4 is a sectional view of the preferred embodiment of the present invention, showing the cam being turned to the second position.
Figure 5:
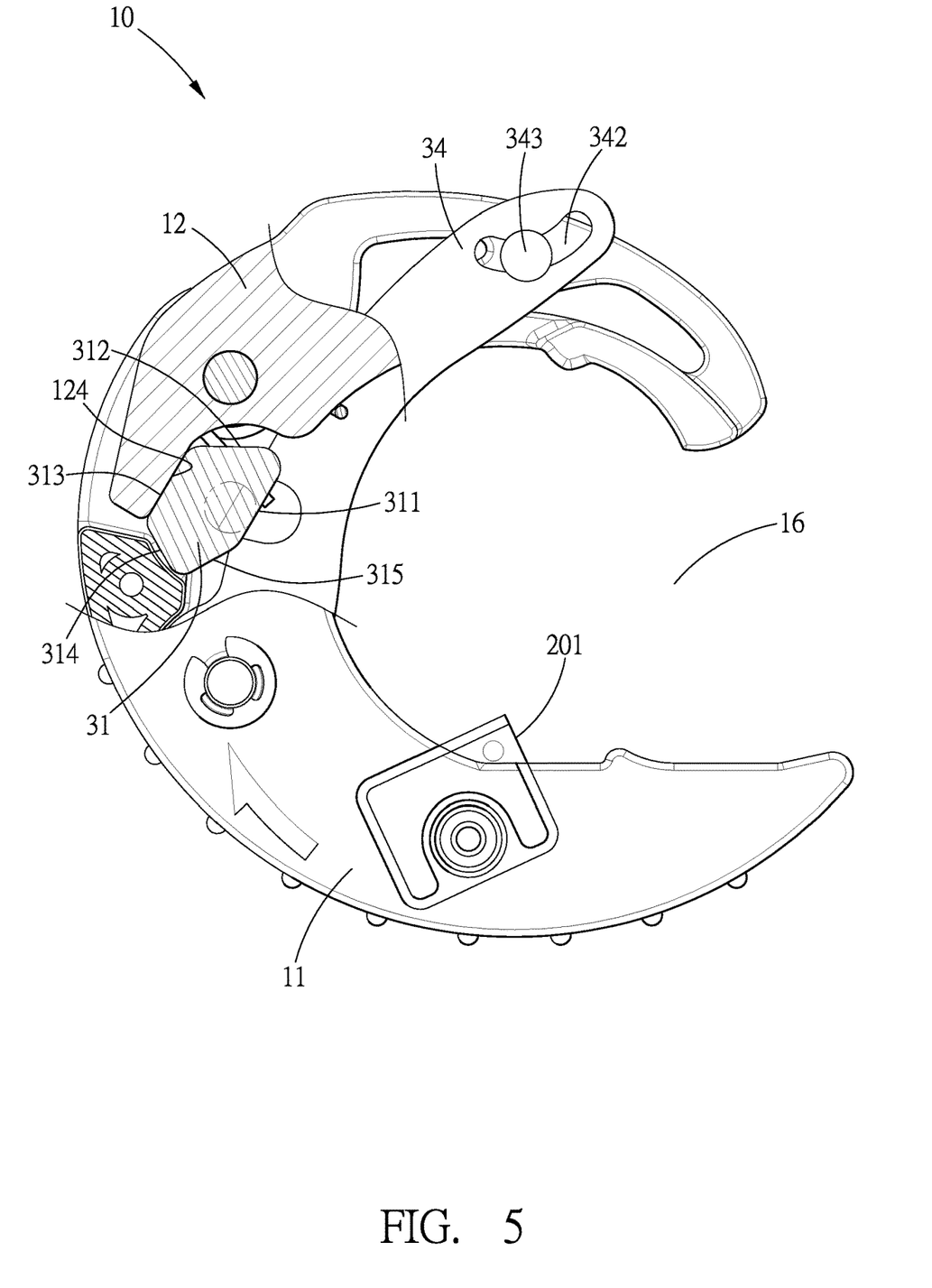
FIG. 5 is a sectional view of the preferred embodiment of the present invention, showing the cam being turned to the third position.
Figure 6:
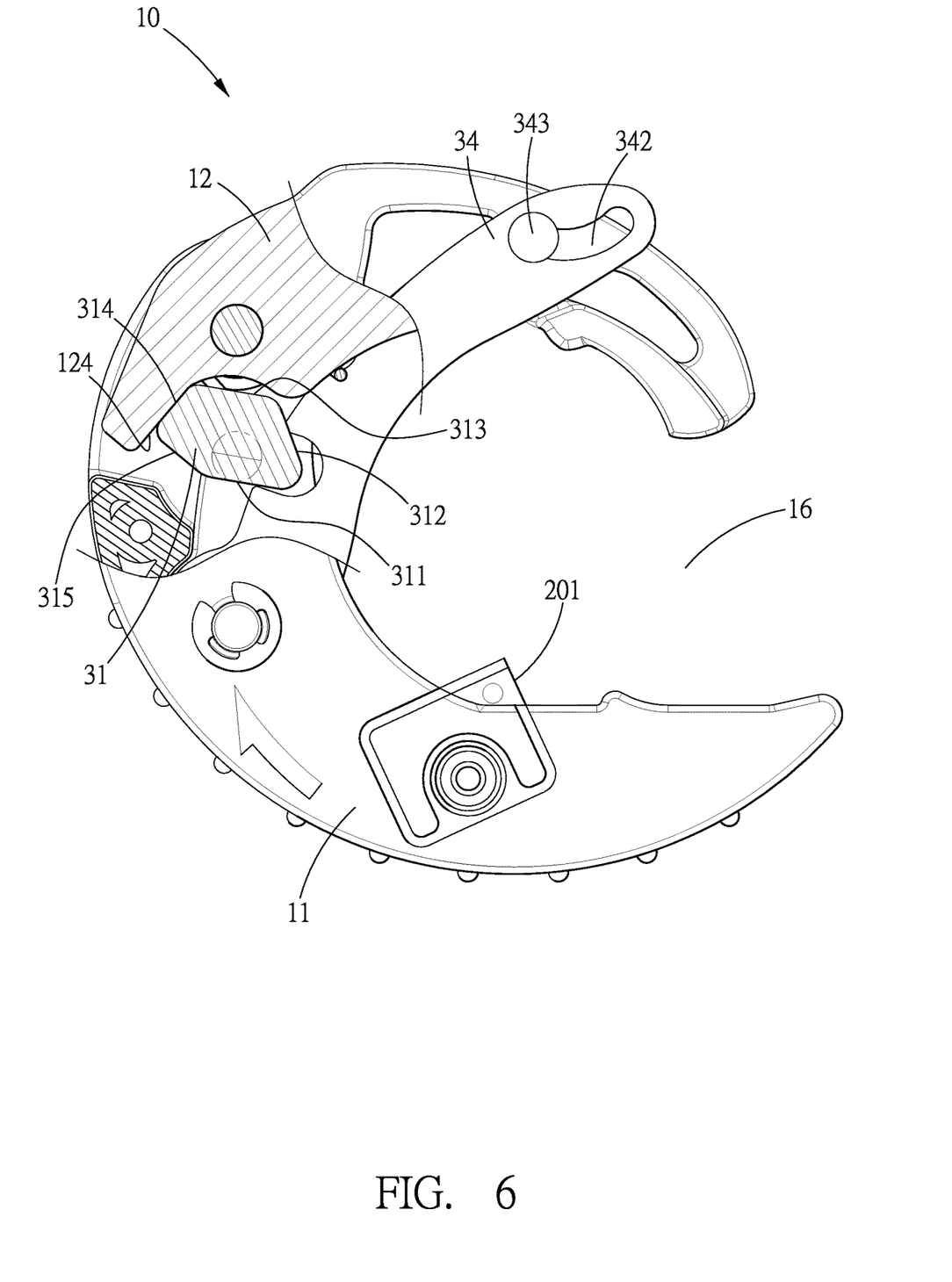
FIG. 6 is a sectional view of the preferred embodiment of the present invention, showing the cam being turned to the fourth position.

As shown in FIG. 4 to FIG. 6, the size of the cutting space 16 may be changed by turning the cam 31. You may clearly see that the size of the cutting space 16 is reduced gradually from FIG. 4, in which the second cam face 312 rests against the resting portion 124, to FIG. 6, in which the fourth cam face 314 rests against the resting portion 124. You also may see that the guider 343 moves in the guiding slot 342 when the cam 31 is turned to have different cam faces against the resting portion 124. As a result, tube cutter of the preferred embodiment of the present invention may cut the tubes with different diameters in an easy way.

It must be pointed out that the embodiments described above are only some preferred embodiments of the present invention. All equivalent structures which employ the concepts disclosed in this specification and the appended claims should fall within the scope of the present invention.

What is claimed is:

1. A tube cutter, comprising:
    a main device including a fixed member and a movable member, wherein the movable member is movably connected to the fixed member, and a cutting space is formed between the fixed member and the movable member;
    a blade, which is fixed to the main device, having a blade portion in the cutting space; and
    a controller provided on the main device to be operated to move the movable member for changing a size of the cutting space;
    wherein the controller has a cam pivoted on the fixed member so that the cam is turnable, and the cam has a first cam face and a second cam face; the movable member has a resting portion to rest against the first cam face or the second cam face of the cam when the cam is turned to move the movable member;
    wherein the controller further includes an elastic member, and the elastic member urges the movable member to press the resting portion thereof on the cam;
    wherein the elastic member has two coil portions and a connecting portion with opposite ends connected to the coil portion; an axle passes through the fixed member and the coil portions; the elastic member is connected to the fixed member with the connecting portion against the movable member.

2. The tube cutter of claim 1, wherein the fixed member is provided with a receiving room, in which a portion of the movable member is received, and a first connector is provided to pivot the movable member on the fixed member.

3. A tube cutter, comprising:
    a main device including a fixed member and a movable member, wherein the movable member is movably connected to the fixed member, and a cutting space is formed between the fixed member and the movable member;
    a blade, which is fixed to the main device, having a blade portion in the cutting space; and a controller provided on the main device to be operated to move the movable member for changing a size of the cutting space;

wherein the controller has a cam pivoted on the fixed member so that the cam is turnable, and the cam has a first cam face and a second cam face; the movable member has a resting portion to rest against the first cam face or the second cam face of the cam when the cam is turned to move the movable member;

wherein the controller further has an arm; the arm is pivoted on the fixed member; the arm has a guiding slot; a guider is inserted into the guiding slot of the arm and connected to the movable member, whereby the guider moves in the guiding slot when the movable member is moved relative to the fixed member.

4. A tube cutter, comprising:

a main device including a fixed member and a movable member, wherein the movable member is movably connected to the fixed member, and a cutting space is formed between the fixed member and the movable member;

a blade, which is fixed to the main device, having a blade portion in the cutting space; and a controller provided on the main device to be operated to move the movable member for changing a size of the cutting space;

wherein the controller has a cam pivoted on the fixed member so that the cam is turnable, and the cam has a first cam face and a second cam face; the movable member has a resting portion to rest against the first cam face or the second cam face of the cam when the cam is turned to move the movable member;

wherein the controller further has two arms and a pipe; the arms are pivoted on the fixed member, and the pipe is provided between the arms; each of the arms has a guiding slot; an axle passes through the fixed member, the arms and the pipe; two guiders are inserted into the guiding slots of the arms respectively and connected to the movable member, whereby the guiders move in the guiding slots when the movable member is moved relative to the fixed member.

5. The tube cutter of claim 1, wherein the controller further includes a knob connected to the cam to be operated by a user.

6. The tube cutter of claim 1, wherein the blade has a portion embedded in the fixed member, and the blade portion is projected from a surface of the fixed member.

7. The tube cutter of claim 1, wherein the cam further has a third cam face to rest against the resting portion of the movable member when the cam is turned to a specified position.

* * * * *